United States Patent

[11] 3,563,477

[72] Inventors Harry W. Schroeder
 Wauwatoosa;
 Raymond S. Tylinski, Milwaukee, Wis.
[21] Appl. No. 765,856
[22] Filed Oct. 8, 1968
[45] Patented Feb. 16, 1971
[73] Assignee Hewitt-Robins Incorporated
 Stamford, Conn.

[54] SEPARABLE PORTABLE PROCESSING PLANT
 4 Claims, 8 Drawing Figs.
[52] U.S. Cl............................................. 241/101
[51] Int. Cl............................................. B02c 21/02
[50] Field of Search.................................... 241/76,
 101; 241/139, 156; 280/(Inquired)

[56] References Cited
 UNITED STATES PATENTS
 3,409,235 11/1968 Quinn........................ 241/101X Primary Examiner—Donald G. Kelly
Attorneys—John L. Shortley and Boos ABSTRACT: A portable bulk material processing plant is provided which comprises two trailer sections which can be joined together into a unitary trailer vehicle or which may be separated and formed into individual vehicles for independent highway travel. A retractable wheel is provided on one of the trailer sections so that the section may be supported for wheeled movement during coupling and uncoupling operations of the two sections. The retractable wheel is specifically provided with an adjustable support system which enables the one trailer section to be adjusted vertically relative the second trailer section so as to thereby facilitate vertically aligning the cooperating coupling elements on each of the trailer sections. In addition, guide elements are provided on the trailer sections which serve to indicate proper lateral alignment of the two trailer sections before the coupling on the two trailer sections are brought into proper interfitting engagement. Finally, the processing equipment on each trailer section is positioned such that, when the two sections are joined together, the combination of the equipment on both sections serves to perform a substantially continuous series of operations on the bulk material being handled.

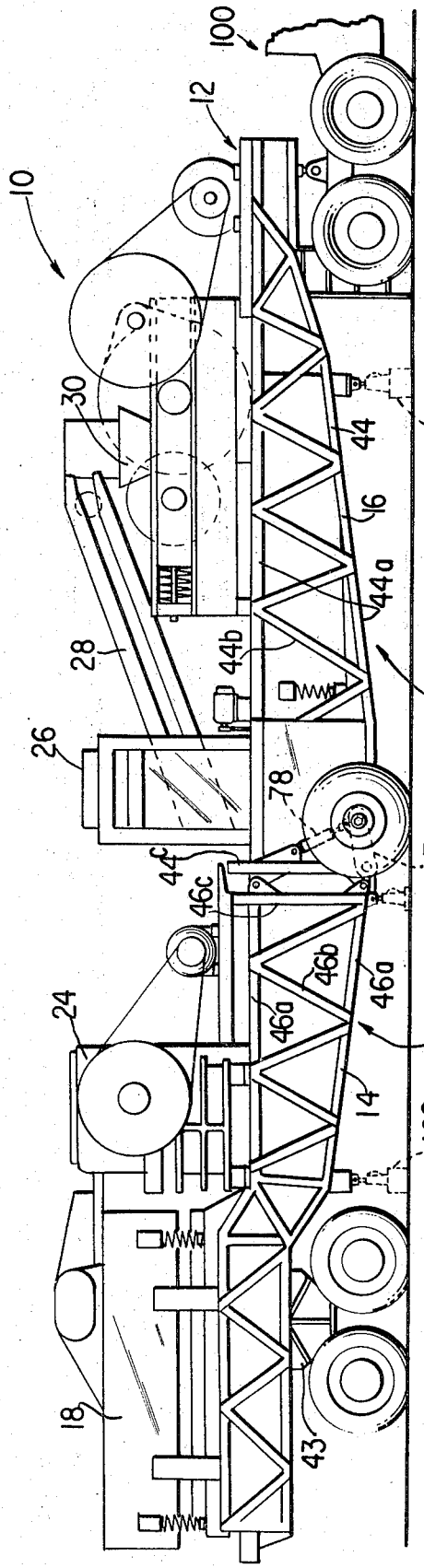

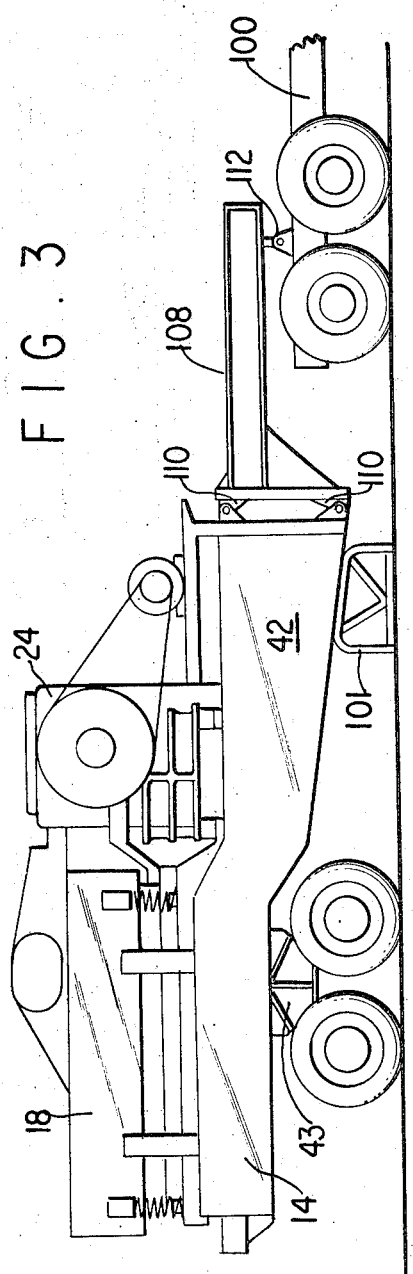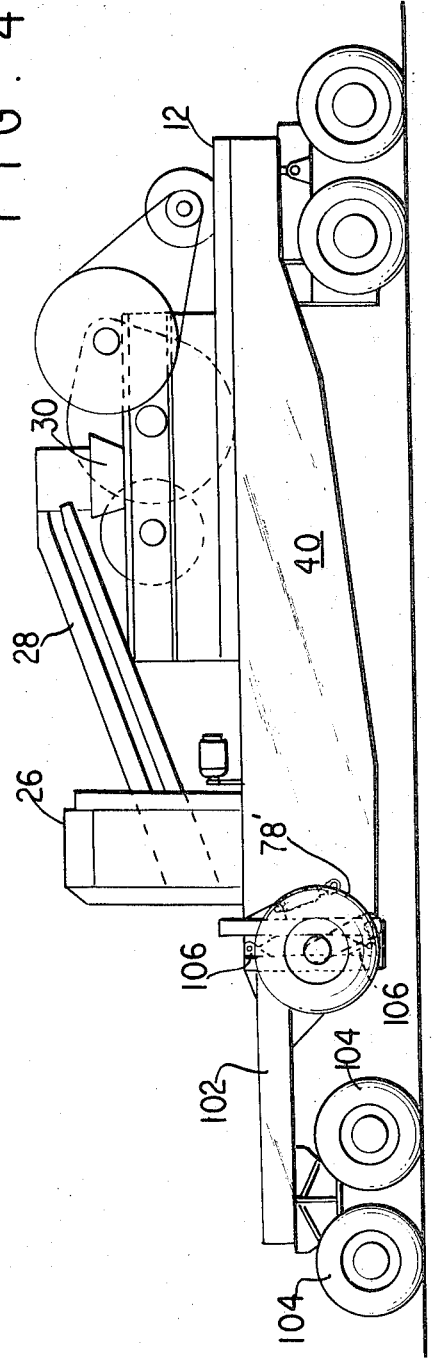

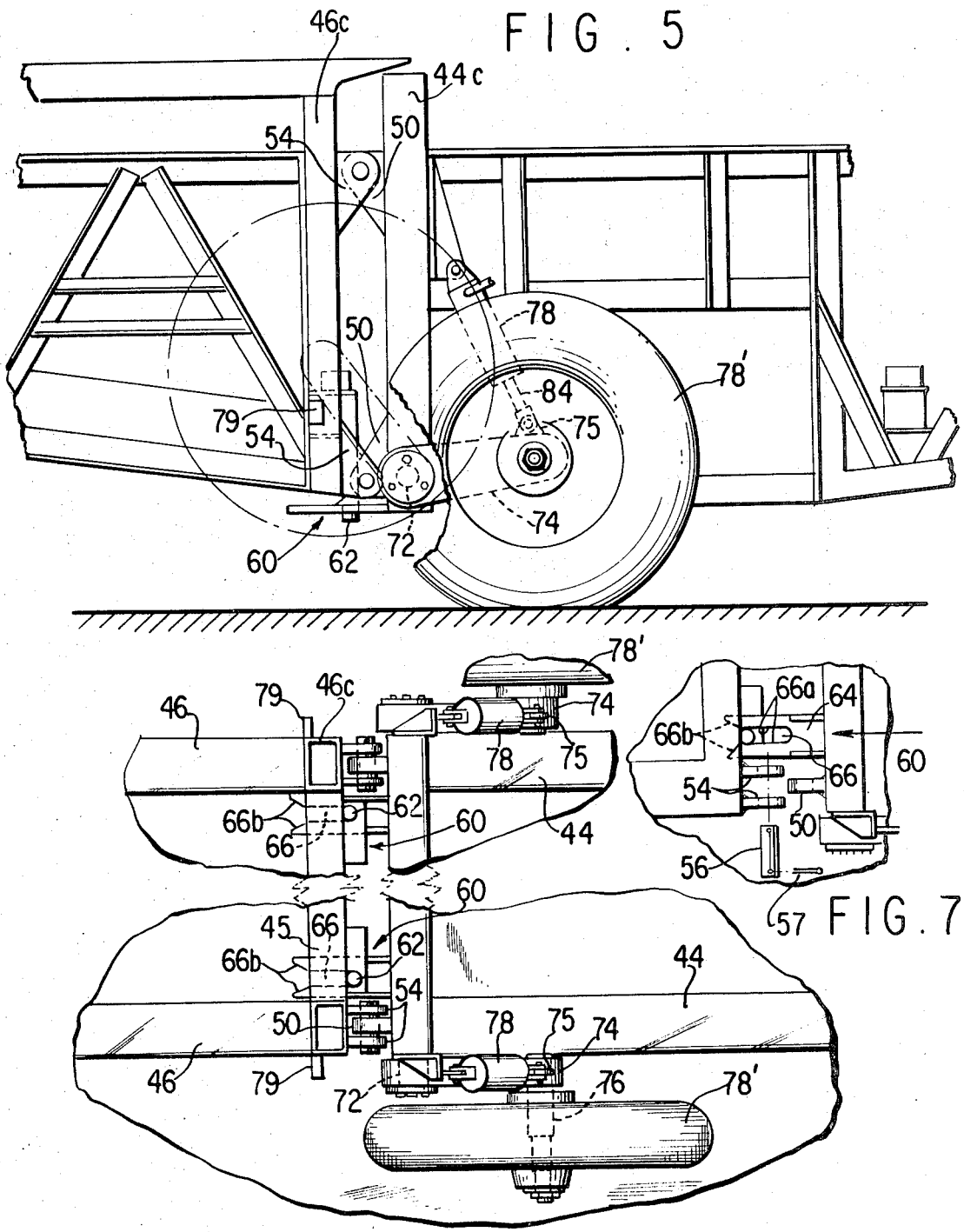

SEPARABLE PORTABLE PROCESSING PLANT

BACKGROUND OF THE INVENTION

The use of portable bulk material processing plants such as the dual crushing and screening plant described in U.S. Pat. No. 3,073,536 are well known in the materials processing art and are frequently employed for processing gravel and producing aggregate or crushed materials of substantially uniform size that is especially suited for use in road construction projects. Apparatus of this nature is usually quite heavy and comprises a number of components for subjecting the material to be processed to a plurality of crushing, screening and sorting operations. These components are generally positioned on a trailer frame together with conveyors or other material handling equipment so that a continuous process may be performed.

Certain types of these portable plants are considered "oversized" in that their length or weight are in excess of certain specified limits. For example, one type of dual crushing plant covered by U.S. Pat. No. 3,073,536 weighs in excess of 100,000 pounds and the owner of this type of portable plant is subjected to a number of restrictive state regulations. For example, the laws in some areas restrict vehicles over a certain total weight or over a certain weight per axle to travel on only certain types of roads. Other laws require licensing or registration of these oversized vehicles at extra expense. Furthermore, the owner of an oversized vehicle will frequently find himself obliged to acquire licenses from several states if the vehicle is going to travel through these states on public highways. Finally, laws in some areas require that a substantial tax be paid for each mile traveled by an oversized vehicle on public highways and these taxes can sharply reduce the profits earned by this type of machine. All of the above regulations greatly handicap the operation of oversized portable processing plants.

One prior art solution for overcoming these regulations has been simply to restrict the design of the portable plants to smaller sizes such that the total weight and dimensions of the plants are excluded from these regulations. However, these small sized portable plants generally do not have the same number of components or components of the same weight on the trailer frame and the plants cannot, therefore, perform the same type of processing. It might therefore be necessary to employ two or more small sized plants in order to perform the same operations as a single oversized plant. Furthermore, if continuous processing of material is to be achieved, the two or more small plants would have to be positioned such that the output of one plant would discharge into the inlet of the second plant and this becomes a particular problem where the two units must be frequently moved from location to location within a single work area. This is a marked disadvantage to the single oversized plant where all the components are anchored in place on a single trailer in such a manner that the plant is always ready for continuous processing of materials with a very minimum of preparation. Thus, there are distinct advantages to oversized portable bulk material processing plants and the problem still remains of how to design oversized vehicles so that they can avoid many of the size regulations which restrict or impair their use on public highways.

SUMMARY OF THE INVENTION

The above-described problems have been overcome by providing a two-piece portable plant which can be separated and formed into two separate trailer sections for travel on public highways and which trailer sections can be united into a trailer vehicle having processing components mounted thereon which are capable of performing a continuous series of crushing, screening, sorting and/or other material processing operations. The structural frames of the trailer sections are provided with coupling means which enable these frames to be united into a single heavy-duty load supporting trailer vehicle. Guide means are also mounted on the trailer sections which enable proper lateral alignment of one trailer section with another and which thereby facilitates joining the two trailer sections together. There is also provided, on one of the trailer sections, a retractable wheel means which enables the trailer section to be supported for wheeled movement during coupling or uncoupling operations with the second trailer section. These retractable wheel means are made vertically adjustable so as to facilitate aligning the trailer sections during the coupling operation. In addition, a wheeled bogie is provided which is adapted to be coupled to the end of one trailer section in order to form a separate short vehicle which is capable of separate highway use.

Accordingly, one object of this invention is to provide a portable bulk material processing plant which may be separated into independent vehicle sections that are capable of separate road travel.

Another object is to provide separate trailer sections that may be adapted for independent highway travel and which may be united together into a single trailer vehicle.

Still another object of this invention is to provide a trailer vehicle having a number of material handling and processing components positioned thereon which facilitates continuously processing bulk materials and which trailer vehicle is separable into individual trailer sections that are adapted to be formed into individual road vehicles.

A further object is to provide accessory equipment for trailer vehicles which are separable into individual trailer sections and which equipment facilitates separation of, and/or joining of the individual trailer sections.

Still a further object is to provide a first trailer section which can be coupled to a second trailer in order to form a trailer vehicle and which first trailer section is also adapted to be coupled to a special wheeled bogie so as to form a separate short vehicle which is capable of separate highway travel.

BRIEF DESCRIPTION OF THE DRAWINGS

Other objects, advantages and novel features of the present invention will become apparent in the following detailed description of the invention when considered in conjunction with the following drawings wherein:

FIG. 1 is a side view of a portable bulk material processing plant that is made with two separate trailer sections according to the present invention.

FIG. 2 is a schematic illustration of the components mounted on the trailer sections and specifically shows the flow path of material during the continuous processing operations.

FIG. 3 is a side view of the rear trailer section shown separated from the front trailer section and having a gooseneck structure coupled thereto.

FIG. 4 is a side view of the front trailer section shown separated from the rear trailer section and having a rear support bogie coupled thereto.

FIG. 5 is a side view of the junction of front and rear trailer sections with parts broken away.

FIG. 6 is a top view of FIG. 5 with parts omitted.

FIG. 7 is a top view similar to FIG. 6 of the guide means employed on the trailer sections.

FIG. 8 is a schematic diagram of the wheel retracting means and related hydraulic system which is employed on the front trailer section of the present invention.

Referring now to the drawings, a portable bulk material processing plant 10 is illustrated which is made up of a trailer vehicle 12 formed from a rear trailer section 14 and a front trailer section 16 coupled together. Mounted on the vehicle are bulk material processing and handling equipment. The particular type of equipment employed on the vehicle would be mainly dependent upon the number and type of processing operations that were desired. It is possible to select equipment which will perform such operations as crushing, mixing, screening, sorting, classifying, conveying, and washing and any combination of one or more or all of the foregoing. The one common feature generally present in all portable bulk material processing plants of this nature is that the equipment is arranged on the vehicle such that, in operation, the equipment performs a substantially continuous series of operations on the bulk material being handled. Thus, at least some of the bulk material being processed by the plant will be moved from one piece of equipment to one or more other pieces of equipment on the vehicle in a substantially continuous operation. Furthermore, the separable portable bulk material processing plant of the present invention is further characterized by the fact that the equipment is positioned on the front and rear trailer sections such that, in normal operations, some of the bulk material being handled by the plant will be moved from equipment on one section to equipment on the other section.

The specific portable plant illustrated in the drawings is of the dual crushing and screening type fully disclosed in U.S. Pat. No. 3,073,536 and, as best seen in FIG. 2, includes double-deck vibratory conveyor units 18, 20, and 22, primary jaw crusher 24, rotary elevator 26, belt conveyor 28, secondary roll crusher 30, and a reversible belt conveyor 32. Each of these pieces of equipment are driven by a suitable power source, not referenced, which could be, for example, either conventional electric motors or internal combustion engines driving the equipment through a conventional power transmission system. The three vibrating conveyor units are designed to move the material thereon toward the center of the trailer vehicle. The top decks of the vibratory screening units are conventional sizing screens, well known in the art, and the lower decks can be provided with either a fine screen that permits the fines to pass through or flat conveyor pan which retains the fines. In the particular system illustrated, the lower decks 20b, 22b are made with conveyor pans and the lower deck 18b is a fine screen positioned over the reject conveyor 32. Thus, the fines fall through deck 18b onto conveyor 32 and they may then be either rejected from, or included in, the crushed products depending upon the direction in which reversible conveyor 32 is driven.

The jaw crusher 24, reject conveyor 32, and the vibratory screen units 18, 20 are mounted on the rear trailer section while rotary elevator 26, conveyor 28, secondary roll crusher 30 and vibratory screen 22 are mounted on the front trailer section. As seen in FIG. 2, the top screen decks 20a, and 22a are specifically positioned so that they will discharge material thereon into the rotary elevator when the front and rear trailer sections are coupled together. It will be recognized that elevator 26 and conveyor 28 combine to form a recycle conveyor means which receives the oversized material from the top deck of screen units 20, 22 and deposits it back into the inlet of the roll crusher for secondary crushing. Thus, when the plant is in normal operation, it is possible to move some of the oversized material substantially continuously from one piece of equipment, the vibratory unit 20, on the rear trailer section to another piece of equipment, the rotary elevator 26, on the front trailer section.

The front and rear trailer sections have structural support frames 40, 42, respectively, and a tandem axle assembly 43 is coupled to the rear of the rear trailer section. The frame for the front trailer section is, as shown in FIG. 2, made up of spaced longitudinal side trusses 44 coupled together by transverse crossmembers, such as the one marked 45 in FIG. 6, and the frame for the rear trailer section is made up of similarly coupled longitudinal side trusses 46. Each side truss for the front and rear trailer sections comprises beams 44a, 46a, respectively, coupled together by reinforcing members 44b, 46b. The front of each rear section truss 46 and the rear of each front section truss 44 are formed with vertically extending reinforcing members 46c, 44c, respectively. The front of the rear support frames and the rear of the front support frame are made substantially the same width so that the members 44c of the front frame can be brought into substantially face to face relationship with the corresponding members 46c of the rear frame when the two trailer sections are positioned in abutting end-to-end relation, as shown in FIG. 1.

Formed on, and extending rearwardly from the member 44c on both of the forward section trusses are tongues 50 having horizontal apertures formed therein. Formed on and extending forwardly from member 46c of both of the rearward section trusses are sets of spaced ears 54 which have aligned horizontal apertures formed therein. As shown in FIG. 6, each set of fears comprises two ears 54 spaced apart a distance which permits a tongue 50 from the front trailer section to fit therebetween with the apertures in the ears 54 and tongue 50 aligned for receiving pin 56. Cotter pins 57 may be mounted through the outer ends of each pin 56 so as to prevent the pins from accidentally sliding out of the apertures. Furthermore, it will be apparent from FIGS. 5 and 6 that the sets of ears 54 and tongues 50 are positioned such that when the front and rear trailer sections are in proper end-to-end position relative each other, each of the tongues 50 cooperate with a set of ears 54 on the rear trailer section, so that pins 56 can couple the front and rear trailer sections together. Thus, it will be recognized that the tongues 50, sets of ears 54 and pins 56 are coupling means which combine together to enable the trailer sections to be releasably and rigidly joined together into a unitary trailer vehicle.

It will be recognized that the separated trailer sections must be exactly laterally aligned relative each other before they may be brought into the position shown in FIG. 6 with the tongues of the front section properly interfitting between the spaced ears of the rear section. In order to facilitate this alignment process, guide means are provided which consist of separate guide devices 60 located on each side of the trailer vehicle. Each guide device consists of a guide rod 62 which is mounted on the front of, and extends vertically downward from, the rear trailer frame, and a guide plate 64 which is mounted below and extends rearwardly from the rear of the front trailer section. The guide plate is formed with a rearwardly opening slot 66. The slot is formed with a first or inner section, which serves as the aligning means and which has substantially parallel sides 66a spaced apart a distance very slightly larger than the diameter of rod 62. A second or outer slot section serves as a locating means and is contiguous with the first section. This second slot section has sides 66b which diverge outwardly from the parallel sides of the first section so that the outer opening of the slot has a width which is greater than the width of the slot in the first section.

The guide devices are mounted on the trailer sections in such a manner that the rods 62 of both devices will be positioned within the aligning means or inner slot sections of their respective guide plates only when the two trailer sections are properly aligned laterally relative each other. Furthermore, the slots are dimensioned and the guide plates are positioned in such a manner that both guide rods will enter the inner slot sections of their respective guide plates before the two trailer sections are brought together with the tongues and ears interfitting as shown in FIG. 6. Thus, it is possible to determine whether the trailer sections are properly aligned before the tongues of the front trailer section are moved into interfitting relation with the appropriate set of ears on the rear trailer section. The guides can then be employed as an aid in steering the front section into the final aligned position with the rear section.

The rear of the front trailer section is adapted to be supported by a retractable wheel means 68, as shown in FIG. 8, which comprises an auxiliary wheel assembly 70 mounted on the outside of each side of the front trailer section and an adjustable support system 71 which serves to maintain the wheel assemblies in operative position. Each wheel assembly is rotatably mounted on a stub shaft 72 which is coupled to, and extends transversely outward from, the side frame of the front trailer section. Specifically, each wheel assembly has a lever 74, the inner end of which is rotatably mounted on one of the shafts 72. The other or outer end of lever 74 is provided with a stub shaft 76 that has a large, truck tire type, support wheel 78 rotatably mounted thereon. An ear 75 having an aperture therein is formed on the outer end of lever 74 so as to receive the coupling means of the jack mechanism in the adjustable support system as will hereinafter be described. It will be recognized that this type of arrangement enables the wheel assemblies to be pivoted about the shaft 72 from the operative or extended position, as shown in the solid line position in FIG. 1, to the inoperative or retracted position, as shown in the dash lined position of FIG. 5. A stop member 79 is coupled to each side of the frame of the rear trailer section and serves to position the auxiliary wheel assemblies in their inoperative position by contacting the lever 74 when they are in the inoperative position shown in the dashed lines in FIG. 5.

The adjustable support system 71 in the preferred embodiment includes a jack mechanism 78 releasably coupled to each wheel assembly and a hydraulic system operatively coupled to the jack mechanisms. Each jack mechanism is essentially a single-acting hydraulic cylinder pivotally coupled to the rear of the frame of the front trailer section and the outer end of the piston rod or actuated portion 84 of the jack mechanism is pivotally and releasably coupled to the ear 75 on the lever 74 of the wheel assembly. The coupling of piston rod 84 to ear 75 may be achieved by, for example, a standard bolt extending through aligned apertures in the ear 75 and in the outer end of the piston rod and the bolt may be retained in position by a nut or other conventional retaining means. The hydraulic system comprises an integral hand pump and reservoir 90 which is coupled to the hydraulic jack mechanisms via outlet line 92, three-position directional valve 93, and lines 94, 95. An adjustable release valve 96 on the pump is located in a bypass line extending from line 92 back to the pump reservoir. This arrangement enables hydraulic fluid to be directed to, or form from, each of the hydraulic cylinders through directional valve 93 so that the jack mechanisms may be raised or lowered either simultaneously or independently. With valve 96 closed and with valve 93 in the position shown in FIG. 8, for example, the hand pump can be employed to force hydraulic fluid into both jack mechanisms simultaneously so as to raise the rear of the front trailer section. Likewise, the trailer section may be lowered by gradually opening adjustable valve 96 so that the weight of the front trailer section acting on the jack pistons will force hydraulic fluid back to the pump reservoir.

When the wheel assemblies are held in operative position by the jack mechanisms, the wheels 78 are capable of supporting the rear of the front trailer section and this enables the trailer section to be readily moved by a conventional tractor or trailer rig means 100 coupled to the front trailer section. Note, however, that these wheel assemblies are relatively light-duty construction in order to take up as little space as possible at the sides of the trailer vehicle and that these wheel assemblies are not, therefore, designed to support the rear of the front trailer section for over-the-road travel on public highways or for extensive off-the-road travel at the job site. The main purpose of these assemblies is simply to support the rear of the front trailer section during coupling and uncoupling operations with the rear trailer section and specifically to support the front trailer section for wheeled movement during these operations. It will also be noted that while the wheel assemblies are relatively light-duty, the wheels 78 are the large truck tire type. This type of wheel is necessary to facilitate the relatively easy movement of the front trailer section over the irregular terrain which is usually present at the job site. Furthermore, the hydraulic system coupled to the jack mechanism is adapted to enable the wheel assemblies to raise or lower each side of the rear trailer section either independently or simultaneously and thereby facilitates vertically aligning during coupling operations.

When the front and rear trailer sections are assembled together and the wheel assemblies are in a retracted position, the resulting single trailer vehicle structure is capable of being hauled as a single unit either over public highways or from location to location within a single work area. To prepare the trailer unit for the material processing operations, it is only necessary to level the trailer vehicle by the use of jacks 102 placed under the trailer frame, position the discharge conveyor under the vibrating conveyors 20, 22 and start up the drive means which power the equipment on the trailer unit. In operation, the material to be processed is deposited onto the top deck 18a of vibratory screening unit 18. The larger stones and rocks, of a size suitable to be fed into jaw crusher 24, are retained on the top deck of the unit while the smaller materials pass therethrough and drop downwardly onto the lower screen deck 18b. The larger stones retained by the top deck are advanced forward by virtue of the vibrating action of the unit and are fed into the jaw crusher where they are broken into smaller pieces. The output of crushed material from the jaw crusher and the material from the lower deck 18b is deposited onto the top deck 20a of vibratory unit 20. Material on this top deck which is of an acceptable final size will drop onto the lower deck 20b where it will be fed onto a discharge conveyor, not shown in FIG. 1 but schematically illustrated in FIG. 2 by the reference numeral 105. Any material which does not fall through the top screen of unit 20 is fed into the rotary elevator 26 which deposits it onto conveyor 28 which, in turn, feeds roll crusher 30. The output of crushed material from the roll crusher is deposited onto the top deck 22a of vibratory unit 22. Material which is of an acceptable final size will fall through the top screen onto the lower deck 22b and will, in turn, be fed onto the discharge conveyor. Material which does not fall through the top screen is fed back into the rotary elevator and is recirculated through the secondary roll crusher.

When, for any reason, it is desired to independently transport the front and rear trailer sections to a new location, it is necessary that they each be formed into a separate trailer vehicle. This is accomplished by first wedging skids 101 under both sides of the front of the rear trailer frame, as shown in FIG. 3, so that this rear section may be maintained in the horizontal position shown when the front trailer section has been separated therefrom. The wheel assemblies are then lowered into their operative positions and the outer end of the piston rods 84 are coupled to the respective levers of the wheel assemblies. The hydraulic system may then be actuated by use of hand pump 90 so as to enable the jack mechanisms to urge the wheels on the wheel assemblies toward the ground so that the wheel assemblies may relieve much of the strain on the coupling pins 56 which join the two sections together. These pins coupling the tongues 50 and ears 54 may now be knocked out and the front trailer section separated from the rear trailer section. The front trailer section is then coupled to a bogie 102 having tandem axles and wheels 104 mounted thereon. The bogie is formed with vertically spaced sets of ears 106 having apertures formed therein, and which ears are similar to, and positioned in the same general relationship as, the sets of ears on the rear trailer section. Thus, the sets of ears on the bogie cooperate with the tongues on the front trailer section so as to form means for releasably and rigidly coupling the rear of the front trailer section to the bogie, as shown in FIG. 4. After the bogie has been attached to the rear of the front trailer section, the jacks may be uncoupled from the wheel assemblies and the wheel assemblies may be swung into a retracted or stowed position.

A portable gooseneck 108 is provided having tongues 110 similar to and in the same general arrangement as the tongues on the front trailer. These tongues 110 provide coupling means which cooperate with the sets of ears on the rear trailer section so that the gooseneck may be joined to the front of the rear trailer section as shown in FIG. 3. The gooseneck is releasably coupled to the rear trailer and the bogie is releasably coupled to the front trailer by the use of the same type pins as those described in connection with the coupling of the front and rear trailer sections together. The gooseneck can be formed with a conventional coupling means 112 which cooperates with and can be coupled to the rear of a conventional trailer rig or the coupling means can be employed to releasably couple the gooseneck to a four-wheel bogie, not shown, which is somewhat similar to the bogie employed with the rear trailer section.

In order to join the trailer sections together, it is necessary to again support the front and rear of the front trailer section and rear trailer section, respectively. This is accomplished by use of skids 101 and the retractable wheel means in the manner previously described. The gooseneck can then be removed from the rear trailer section and the bogie can be removed from the front trailer section. The front trailer section can then be backed into coupling position with the tongues interfitting between the sets of ears on the rear trailer section. For this purpose the guide devices 60 serve to indicate when the two sections have the proper lateral alignment and the adjustable support system cooperates with the auxiliary wheel means to enable the front trailer section to be properly positioned vertically with respect to the rear trailer section. The front trailer section is first moved rearwardly so that the rod 62 of each guide device will be positioned within the outer slot of the associated guide plate. At this point it is determined by visual inspection whether the apertures in each set of ears 50 and the apertures in tongue 54 which cooperate with the apertures in each set of ears appear to be in the same horizontal plane. Any difference in elevation can be corrected by manual control of valve 93 and use of either pump 90 and/or valve 95 so that both sides of the rear of the front trailer section may be raised or lowered either independently or simultaneously. The front trailer is then again moved and jockeyed rearwardly in order to position the rods 62 of each guide device within the inner section of the slot in guide plate associated with each guide device. When this alignment procedure has been accomplished, it will be recognized that the ears and tongues are in the proper lateral alignment and the front trailer section can be moved rearwardly until the tongues and ears are in proper interfitting engagement. Any new vertical misalignment of the apertures can be corrected by use again of the adjustable support system for raising or lowering either or both sides of the front trailer section, as previously described. When the apertures are in proper alignment the pins may be inserted and locked in position. The skids are then removed and the auxiliary wheel means are uncoupled from the adjustable support means and are pivoted into the retracted or inoperative position.

It will be apparent that the above described portable processing plant may be readily separated and formed into two separate short trailer vehicles for independent road travel and then rejoined together so as to again be formed into a unitary trailer vehicle. The material processing equipment mounted on the trailer sections are positioned in such a manner that some of the material being processed will normally move from equipment on one trailer section to equipment on the other trailer section. Furthermore, the trailer unit is designed to be separated at the location where the equipment of one trailer section (e.g., the top deck 20a of vibrating screen 20) extends outwardly so that when assembled, it will be in material discharging relationship with the rotary elevator on the other trailer section. With this type of arrangement, it is merely necessary to assemble the trailer sections together in order for the processing plant to be ready for operation. While this is the preferred embodiment, it will also be recognized that certain equipment, such as extensible conveyors, might also be mounted on the trailer sections which would normally extend across the two trailer sections and which might be retracted when the two sections were separated. Under these circumstances, the reassembling of the two trailer sections would also require the repositioning of the extensible conveyor after the sections are reassembled in order to prepare the plant for continuous operation. This type of design would be slightly more complex, but the basic advantage of having a portable processing plant separable into two trailer sections would still be maintained.

The retractable wheel means is a relatively simple design and a more complex system could be provided for a more automated type of operation. For example, the auxiliary wheel assemblies are presently manually pivoted between their operative and inoperative positions, however, a conventional powered system might also be provided for extending and retracting these assemblies. In addition, more sophisticated controls could be provided on the adjustable support system such that, for example, automatic leveling of the front trailer section relative the rear trailer section may be made. Finally, it will be apparent that an equivalent electrical or mechanical adjustable support system could be employed in lieu of the described hydraulic system.

Obviously many other modifications and variations of the present invention are possible in light of the above teaching. It is therefore to be understood that the invention may be practiced otherwise than as specifically described.

We claim:

1. A portable plant having bulk material processing equipment mounted thereon, said plant comprising a front and rear trailer section, said front and rear trailer sections comprising coupling means releasably and rigidly connecting said front trailer section and said rear trailer section together into a unitary trailer vehicle, said front trailer section comprising a structural support frame, retractable wheel means coupled to said front trailer section at the rear of said frame for supporting said front trailer section during coupling and uncoupling of said front trailer section and said rear trailer section, said coupling means comprising a series of tongues mounted in the rear of said front trailer section and a number of sets of spaced ears mounted on the front of the rear trailer section, said ears and said tongues having horizontal apertures formed therein, said front and said rear trailer sections being aligned in abutting end-to-end relation with each said tongue on said front trailer section interfitting between one of said sets of ears on said rear trailer section so that the apertures in the tongues and in each corresponding set of ears of ears are aligned, pin means removably mounted in the aligned apertures.

2. A portable plant as defined in claim 1 wherein guide devices are provided on each side of said front and rear trailer sections so as to indicate the proper lateral alignment of the two trailer sections before they are moved into end-to-end abutting relation.

3. A portable plant as defined in claim 2 wherein each of said guide devices comprises a vertically mounted guide rod on one of the said trailer sections and a horizontally mounted guide plate on the other of said trailer sections, said guide plate being formed with an open ended guide slot which is slightly wider than said guide rod, said guide plate and said guide rod being positioned so that said guide rod may be moved into said guide slot as said trailer sections are moved into abutting end-to-end relation during the coupling operation, said guide devices indicating proper lateral alignment when the trailer sections have been positioned such that the guide rods of said guide devices are positioned within said guide slots.

4. A portable plant as defined in claim 1 wherein said retractable wheel means comprises an auxiliary wheel assembly mounted on each side of said frame of said front trailer section for movement between an extended and a retracted position and an adjustable support system which is adapted to be releasably coupled to said wheel assemblies for maintaining and adjusting said wheel assemblies in said extended position.